(12) United States Patent
Schwach et al.

(10) Patent No.: US 12,188,806 B2
(45) Date of Patent: Jan. 7, 2025

(54) AUTOMATIONS DEVICE FOR MONITORING FIELD LEVEL SENSORS IN OIL AND GAS INDUSTRY

(71) Applicant: Andium Inc., New York, NY (US)

(72) Inventors: Jory Schwach, New York, NY (US); Rongkai Xu, Holmdel, NJ (US); Jatan Pathak, Jersey City, NJ (US); Alexander Ayala, New York, NY (US)

(73) Assignee: Andium Inc., New York, NY (US)

( * ) Notice: Subject to any disclaimer, the term of this patent is extended or adjusted under 35 U.S.C. 154(b) by 407 days.

(21) Appl. No.: 16/617,234

(22) PCT Filed: May 29, 2018

(86) PCT No.: PCT/US2018/034901
§ 371 (c)(1),
(2) Date: Nov. 26, 2019

(87) PCT Pub. No.: WO2018/222597
PCT Pub. Date: Dec. 6, 2018

(65) Prior Publication Data
US 2021/0123784 A1    Apr. 29, 2021

Related U.S. Application Data

(60) Provisional application No. 62/512,165, filed on May 29, 2017.

(51) Int. Cl.
*G01F 23/22* (2006.01)
*G01J 5/00* (2022.01)
*H04L 67/12* (2022.01)
*H04W 4/38* (2018.01)

(52) U.S. Cl.
CPC ............ *G01F 23/22* (2013.01); *G01J 5/0037* (2013.01); *H04L 67/12* (2013.01); *H04W 4/38* (2018.02); *G01J 2005/0077* (2013.01)

(58) Field of Classification Search
CPC . G01F 23/22; G01J 5/0037; G01J 2005/0077; H04L 67/12; H04W 4/38; E21B 41/00
See application file for complete search history.

(56) References Cited

U.S. PATENT DOCUMENTS

| | | | |
|---|---|---|---|
| 4,845,486 A | 7/1989 | Knight et al. | |
| 4,976,146 A | 12/1990 | Senghaas et al. | |
| 5,627,523 A * | 5/1997 | Besprozvanny | G01F 23/72 |
| | | | 73/304 R |
| 6,967,589 B1 * | 11/2005 | Peters | E21B 47/00 |
| | | | 340/854.6 |
| 9,711,038 B1 * | 7/2017 | Pennebaker, III | G01F 23/18 |

(Continued)

*Primary Examiner* — Amine Benlagsir
(74) *Attorney, Agent, or Firm* — Dykema Gossett PLLC (57) ABSTRACT

Various embodiments of the present disclosure include a system for monitoring field level sensors at an oil site. The system can include a sensor node configured to monitor a characteristic associated with an oil site. The system can include a remote terminal unit, comprising a processor and memory storing non-transitory computer readable instructions, the instructions executable by the processor to receive information from the sensor node. The system can include a central computer, wherein the remote terminal unit sends the information from the sensor node to the central computer.

17 Claims, 5 Drawing Sheets

(56) References Cited

U.S. PATENT DOCUMENTS

| | | | |
|---|---|---|---|
| 2008/0208701 A1 | 8/2008 | Betancourt et al. | |
| 2013/0298642 A1* | 11/2013 | Gillette, II | B65D 25/38 73/31.01 |
| 2015/0287313 A1* | 10/2015 | Silvers | G01F 22/00 340/618 |
| 2016/0180475 A1* | 6/2016 | Phillips | G06Q 10/0834 705/7.13 |
| 2016/0341591 A1 | 11/2016 | Cpullo et al. | |
| 2016/0372225 A1* | 12/2016 | Lefkowitz | B01D 46/46 |
| 2022/0151437 A1* | 5/2022 | Debonte | A47J 37/1266 |
| 2023/0144546 A1* | 5/2023 | Potucek | A61H 33/0095 700/282 |

* cited by examiner

AUTOMATIONS DEVICE FOR MONITORING FIELD LEVEL SENSORS IN OIL AND GAS INDUSTRY

CROSS-REFERENCE TO RELATED APPLICATIONS

This application is a national stage filing based upon international application no. PCT/US2018/034901, filed 29 May 2018 and published in on 6 Dec. 2018 under international publication no. WO 2018/222597 (the '901 application). This application claims the benefit of U.S. provisional application No. 62/512,165, filed 29 May 2017 (the '165 application). The '901 application and the '165 application are both hereby incorporated by reference as though fully set forth herein

BACKGROUND

Traditional design for control and monitoring of equipment on oil and gas sites uses supervisory control and data acquisition (SCADA). SCADA uses multiple levels of computers, which can increase a cost and complexity associated with the control and monitoring of equipment. In an example, at a high level, SCADA can utilize four different levels of computers. For instance, at a production scheduling level, a computer center can provide control over production control, which can employ coordinating computers. The coordinating computers can provide control over a plant supervisory level, which can employ supervisory computers. The supervisory computers provide control over a direct control level, which can employ additional controllers. The additional controllers can provide control over a plant level, which in some embodiments can further employ additional controllers. Embodiments of the present disclosure can simplify the control hierarchy associated with oil and gas sites.

SUMMARY

Various embodiments of the present disclosure include a system for monitoring field level sensors at an oil site. The system can include a sensor node configured to monitor a characteristic associated with an oil site. The system can include a remote terminal unit, comprising a processor and memory storing non-transitory computer readable instructions, the instructions executable by the processor to receive information from the sensor node. The system can include a central computer, wherein the remote terminal unit sends the information from the sensor node to the central computer.

Various embodiments of the present disclosure include a method for monitoring an oil site. The method can include gathering information with a sensor node, the information including a characteristic associated with an oil storage tank from a sensor node. The method can include receiving the information with a remote terminal unit in communication with the sensor node. The method can include processing the information with the remote terminal unit and sending the information to a central computer.

Various embodiments of the present disclosure can include a method for allowing access to an oil storage tank. The method can include determining, with a remote terminal unit, that a mobile device is within a defined range from an authentication node. The method can include determining, with the remote terminal unit, whether the mobile device is authorized, based on a signal received from the mobile device. The method can include releasing a lock associated with the oil storage tank in response to determining, with the remote terminal unit, that the mobile device is authorized.

Various embodiments of the present disclosure can include a method for determining a level of fluid in a storage tank. The method can include capturing a thermal image of the storage tank with a thermal camera. The method can include analyzing the data to determine a thermal interface between a filled portion of the storage tank and an empty portion of the storage tank. The method can include determining a level of fluid in the storage tank, based on a location of the thermal interface between the filled portion of the storage tank and the empty portion of the storage tank.

DETAILED DESCRIPTION

Embodiments of the present disclosure are described below with reference to the accompanying figures. The features and advantages which are explained are illustrated by way of example and not by way of limitation. One of ordinary skill in the art will recognize that there are additional features and advantages provided by embodiments of the present disclosure beyond those described herein.

Figure 1:
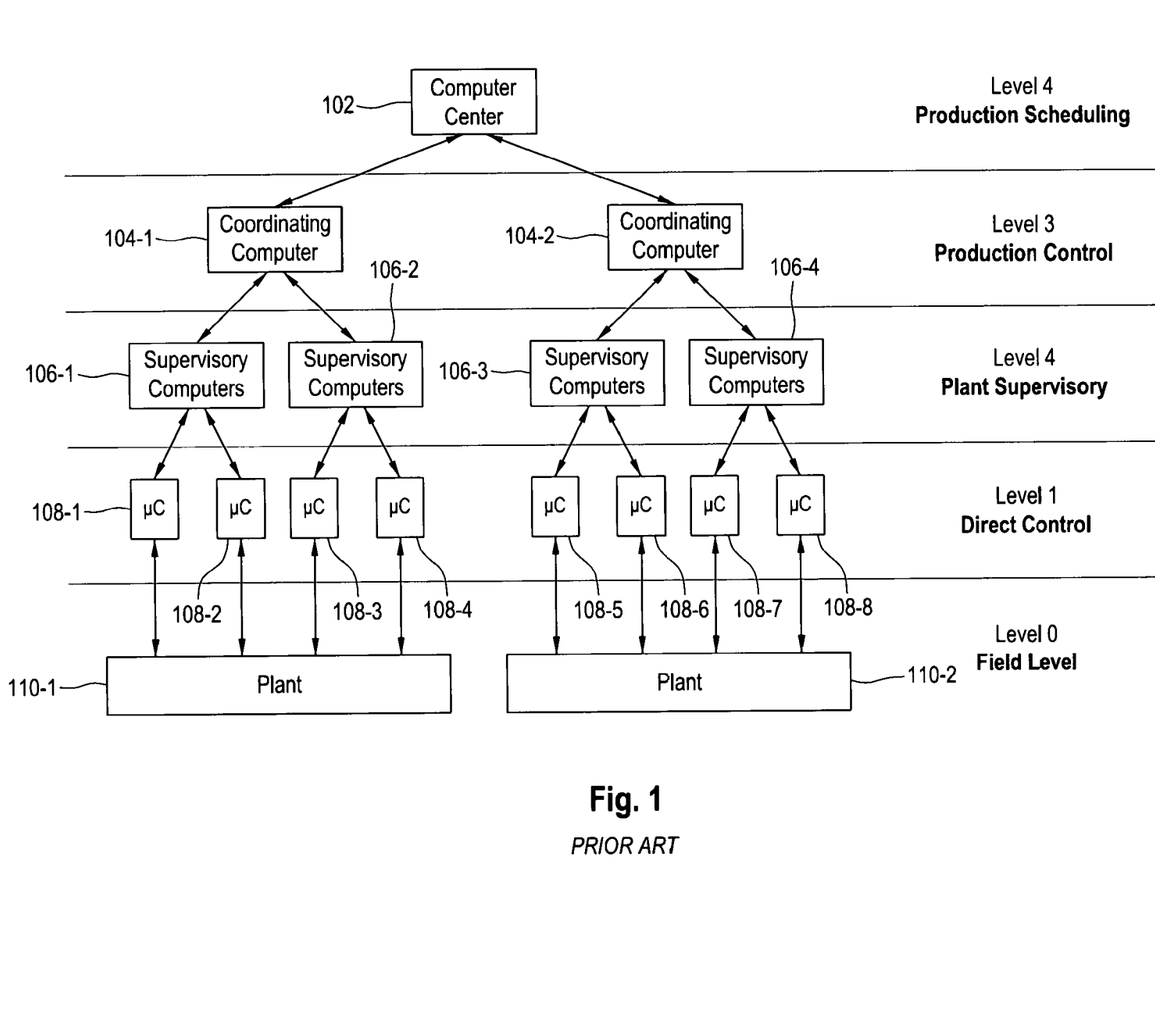
FIG. 1 depicts a prior art system that employs supervisory control and data acquisition (SCADA) for control and monitoring of equipment on oil and gas sites, in accordance with embodiments of the present disclosure.

FIG. 1 depicts a prior art system that employs supervisory control and data acquisition (SCADA) for control and monitoring of equipment on oil and gas sites, in accordance with embodiments of the present disclosure. As depicted, SCADA uses multiple levels of computers, which can increase a cost and complexity associated with the control and monitoring of equipment. As depicted in FIG. 1, SCADA can utilize four different levels of computers. For instance, at a production scheduling level, a computer center 102 can provide control over production control, which can employ coordinating computers 104-1, 104-2. The coordinating computers 104-1, 104-2 can provide control over a plant supervisory level, which can employ supervisory computers 106-1, 106-2, 106-3, 106-4. The supervisory computers provide control over a direct control level, which can employ additional controllers 108-1, 108-2, 108-3, 108-4, 108-5, 108-6, 108-7, 108-8. The additional controllers can provide control over a plant level 110-1, 110-2, which in some embodiments can further employ additional controllers. Embodiments of the present disclosure can simplify the control hierarchy associated with oil and gas sites. Additionally, among other benefits of the present disclosure, which will become apparent after review thereof, embodiments of the present disclosure can increase a versatility with which different types and formats of data can be handled.

Figure 2:
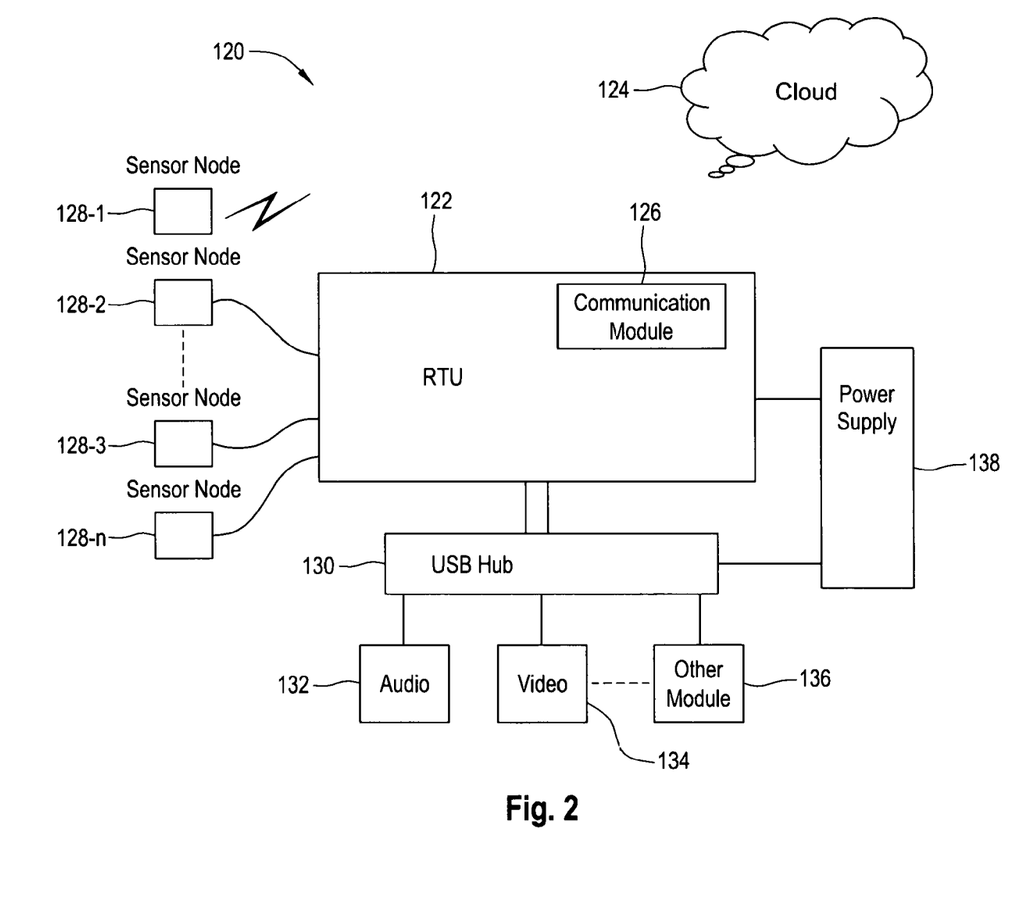
FIG. 2 depicts a system for monitoring field level sensors in the oil and gas industry, in accordance with embodiments of the present disclosure.

FIG. 2 depicts a system 120 for monitoring field level sensors in the oil and gas industry, in accordance with embodiments of the present disclosure. In contrast to the complex and costly prior art system described in relation to FIG. 1, the system 120 of the present disclosure can include a remote terminal unit (RTU) 122, which replaces the multiple devices in the hierarchy of devices included in the prior art system disclosed in FIG. 1. The RTU 122 is a microprocessor-controlled electronic device that interfaces objects in the physical world by transmitting telemetry data to a master system and by using messages from the master supervisory system to control connected objects.

The RTU 122 can be a device installed at a remote location that collects data, codes the data into a format that is transmittable and transmits the data back to a central station or master device (e.g., cloud 124). The RTU 122 can collect information from the master device and implement processes that are directed by the master device. RTUs 122 can be equipped with input channels for sensing or metering, output channels for control, indication or alarms, and/or a communication port.

Through embodiments of the present disclosure, one device (e.g., an RTU 122) can replace and combine several existing levels into one. The same device (e.g., the RTU 122) can be used to communicate with field level sensors using wired or wireless technologies. The architecture of the RTU 122 considers both the Internet of Things (IoT) solution as well as IoT service provider philosophy.

The RTU 122 can include a microcontroller, wherein the microcontroller includes a bootloader, a device memory, and a processor configured to execute instructions stored on the device memory. A communication module 126 can include an LTE module or a Long-Range radio (LoRa), which can be in communication with the microcontroller. An antenna can be in communication with the communication module 126 (e.g., LTE interface) and can be configured to be energized by a signal received by the communication module 126. For example, the communication module 126 can be energized by a signal received from the cloud 124, in some embodiments. The LTE module and/or a long-range radio included in the communication module 126 can also directly communicate with the cloud 124. For example, the LTE module and/or long-range radio can be configured to transmit information from one or more of the sensor nodes 128-1, 128-2, 128-3, . . . , 128-n to the central computer via the RTU 122.

In some embodiments, the system 120 can be used for monitoring field level sensors at an oil site. As used herein, an oil site can include a well, storage tanks, pumps, and/or other related equipment used in the production of oil or gas. The equipment can be monitored via one or more sensor nodes 128-1, 128-2, 128-3, . . . , 128-n. The sensor nodes 128-1, 128-2, 128-3, . . . , 128-n can be configured to monitor one or more characteristics associated with the oil site. In an example, a single sensor node 128-1, 128-2, 128-3, . . . , 128-n can be included on the oil site and can measure a single characteristic and/or a plurality of sensor nodes 128-1, 128-2, 128-3, . . . , 128-n can be included on the oil site, which can each monitor the same or different characteristics associated with the oil site. In some embodiments, the sensor nodes 128-1, 128-2, 128-3, . . . , 128-n can monitor things, such as a level of oil in an oil storage tank, a flow rate of oil out of an outlet pipe from a tank, a pressure associated with a well head and/or flow rate of oil flowing out of the well head, a pressure in a pipe connected to the well head and/or a pressure of the oil storage tank, among other types of data associated with the oil site.

In some embodiments, the sensor nodes 128-1, 128-2, 128-3, . . . , 128-n can be in communication with the RTU 122 via a wired or wireless connection. For example, the sensor nodes 128-2, 128-3, . . . , are depicted as being in communication with the RTU 122 via wired connections (e.g., directly connected), while the sensor node 128-1 is depicted as being in communication with the RTU via a wireless connection. In some embodiments, one or more of the sensor nodes can be in communication with one another. For example, sensor nodes 128-2 and 128-3 can be in communication with one another.

In some embodiments, as discussed herein, the remote terminal unit 122 can include a processor and memory storing non-transitory computer readable instructions. The instructions can be executable by the processor to receive information from the one or more sensor nodes 128-1, 128-2, 128-3, . . . , 128-n. As discussed above, the information can include a level of oil in an oil storage tank, a flow rate of oil out of an outlet pipe from a tank, a pressure associated with a well head and/or flow rate of oil flowing out of the well head, a pressure in a pipe connected to the well head and/or a pressure of the oil storage tank, among other types of data associated with the oil site. The information received form the sensor nodes 128-1, 128-2, 128-3, . . . , 128-n can be in an analog format and/or a digital format. In some embodiments, the one or more sensor nodes can be a camera and/or a microphone in some embodiments. One of the benefits of the present disclosure, in contrast to previous approaches, is that the RTU 122 can accept both analog and digital data. Many sensors associated with new and/or aging oil sites can be analog sensors. The analog signals produced by the analog sensors may make it difficult to transmit data associated with the signals to a central computer and/or analyze the data. Embodiments of the present disclosure can receive information in an analog and/or digital format from the one or more sensor nodes 128-1, 128-2, 128-3, . . . , 128-n and can send the data to the central computer (e.g., cloud 124). In some embodiments, the RTU 122 can convert the analog data into a digital format and send the converted data in the digital format to the cloud 124.

In some embodiments, the RTU 122 can receive updated instructions, which can be executable by the processor of the RTU 122. For example, the central computer can provide updated software instructions to the RTU 122 for execution. The software updates can include, in some embodiments, adjusted set points associated with alarms and or adjusted set points for triggering the sending and/or processing of data. In some embodiments, the RTU 122 can receive instructions to enable the RTU 122 to interface with a new type of sensor that is directly connected to the RTU 122 and/or connected to the RTU via hub 130. In an example, over the air updates can be sent to the RTU 122, enabling deployment of another or different application on the RTU 122. This can enhance flexibilities to fix bugs and add new software features. In an example, developers can develop new applications and transmit the applications from the cloud 124 to the RTU 122 via over the air updates. In some embodiments, all communications between the cloud 124 and the RTU 122 can be encrypted.

In some embodiments, a hub 130 can be connected to the RTU 122. In some embodiments, the hub 130 can include adapters that can enable various modules to be connected to the hub and ultimately to the RTU 122. In an example, the adapters can include one or more uniform serial buses, or other types of ports, which can enable one or more audio feeds 132, video feeds 134, and/or feeds from other module 136 to be received by the RTU 122. In an example, the hub 130 can allow for one or more devices to be connected to the hub 130, enabling the transmission of data from the one or more devices (e.g., devices generating audio feed 132, video feed 134, other type of feed 136). For instance, the hub 130 can allow for a wired connection to the one or more devices. In some embodiments, the hub 130 can include one or more wireless antennas to allow for a wireless connection to the one or more devices.

In some embodiments, the hub 130 can be powered separately than the RTU 122. For example, although the RTU 122 and the USB hub 130 can be powered from a same power supply 138, the RTU 122 and the USB hub 130 can be separately powered by the same power supply 138. Accordingly, even if devices connected to the RTU 122, such as the device supplying audio feed 132, video feed 134, or other type of feed from module 136; the sensor nodes 128-1, 128-2, 129-3, 128-n; or hub 130 are damaged, for example, by a lightning strike, the RTU 122 may not be affected.

In some embodiments, the system 120 can include a cloud 124, which can be representative of one or more central computers. As discussed, the RTU 122 can send information received from the one or more sensor nodes 128-1, 128-2, 129-3, 128-n and/or one or more devices supplying the audio feed 132, video feed 134, and/or other type of feed from module 136.

In some embodiments, the audio feed 132 and the video feed 134 can be provided by an audio recorder (e.g., microphone) and/or a camera (e.g., video recorder), which can help provide security over the oil site. In an example, as discussed herein, the audio feed 132 and/or the video feed 134 can be received by the RTU 122 and can be sent to the cloud 124 via communication module 126. In some embodiments, the audio feed 132 can be used to help diagnose operating equipment noises. For example, the audio feed 132 can be analyzed by the RTU 122 to determine whether any unfamiliar noises are present. For example, a screeching pump can be detected, based on a noise of the screech. In some embodiments, upon detection of the uncharacteristic noise (e.g., screech), an alert can be generated by the RTU 122, which can be sent to the cloud 124 for handling (e.g., service personnel can be dispatched to diagnose the noise).

Some embodiments of the present disclosure can include a method for monitoring an oil site. In some embodiments, the method can include gathering information with one or more of the sensor nodes 128-1, 128-2, 129-3, 128-n. In some embodiments, the one or more of the sensor nodes 128-1, 128-2, 129-3, 128-n can be sensors associated with an oil storage tank, oil pipeline, oil well, or some other piece of equipment associated with an oil storage and/or oil pumping site. In some embodiments, the sensor nodes 128-1, 128-2, 129-3, 128-n can be antiquated analog devices and may not include connectors and/or ports for direct connection to the USB hub 130. In an example, the sensor nodes 128-1, 128-2, 129-3, 128-n can be directly connected to the RTU 122, for processing and/or sending of information by the communication module.

As discussed, the method can include receiving the information with the RTU 122 in communication with the one or more sensor nodes 128-1, 128-2, 129-3, 128-n. The information can be processed by the RTU 122 and/or sent to a central computer (e.g., cloud 124), via the communication module 126. The method can further include other steps discussed herein.

Figure 3:
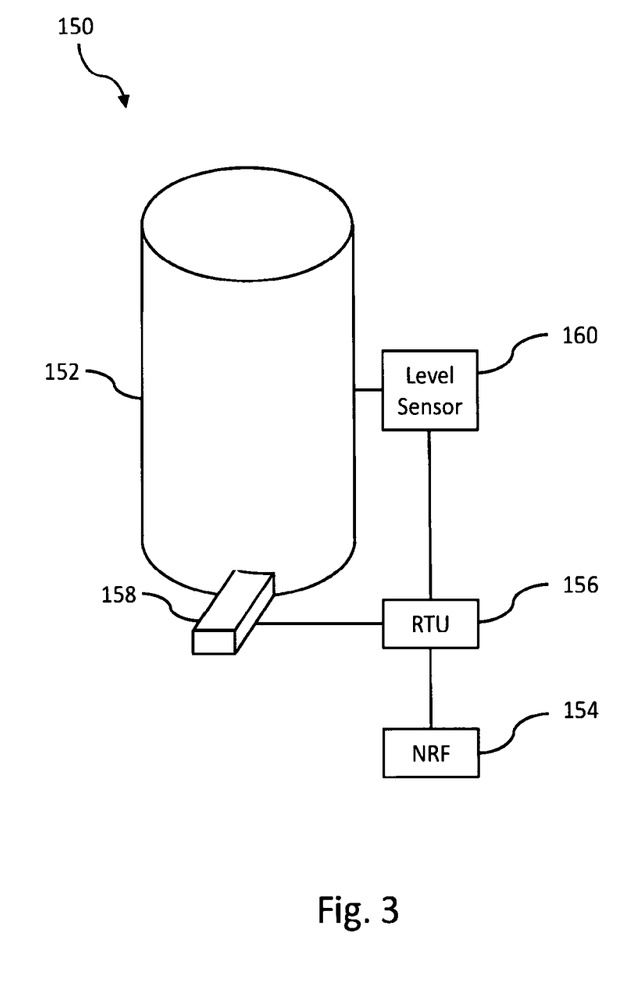
FIG. 3 depicts an oil storage tank system 150, in accordance with embodiments of the present disclosure.

FIG. 3 depicts an oil storage tank system 150, in accordance with embodiments of the present disclosure. In some embodiments, the oil storage tank system 150 can include an oil storage tank 152. The oil storage tank 152 can store crude and/or processed oil, in some embodiments. The oil storage tank 152 can include a flow meter 158, which can measure a flow of oil out of the oil storage tank 152 and/or into the oil storage tank 152. The flow meter 158 can be connected to an RTU 156, which can receive data from the flow meter 158, process the data, and/or send the data and/or alerts to a central computer. The oil storage tank system 150 can further include a level sensor 160. The level sensor 160 can measure a level of oil in the oil storage tank 150. In some embodiments, the level sensor 160 can be an ultrasonic sensor that is placed within the oil storage tank 150. In some embodiments, the level sensor 160 can be a thermal camera that is positioned such that the oil storage tank 152 is within a field of view of the thermal camera. The thermal camera can be connected, to the RTU 156, which can analyze a feed from the thermal camera and determine a thermal gradation of the oil storage tank 152 that indicates a level of oil in the oil storage tank 152. For example, the portion of the oil storage tank 152 filled with oil can have a different temperature profile than an empty portion of the oil storage tank 152 due to the oil that fills the filled portion of the oil storage tank having a different temperature and/or heat capacity than air filling the empty portion of the oil storage tank 152. In an example where the oil storage tank 152 is half full, the bottom half containing oil may appear to be colder than the top half containing air, which can be represented in the feed received from the thermal camera by the RTU 156. Through processing of the feed received from the thermal camera, a determination can be made by the RTU and/or some other central computer that the oil storage tank is half full. Likewise, a determination can be made of how full the oil storage tank 152 is, at any level (e.g., 42% full, 59% full, 77% full, etc.).

In some embodiments, the oil storage tank system 150 can include an NRF chip 154, or other nearfield communication device. In an example, the NRF chip 154 can be a low power Bluetooth® chip. However, the NRF chip 154 can utilize other types of Bluetooth® and/or can employ a sensor using another type of communication, rather than Bluetooth®.

Some embodiments of the present disclosure can include a method for allowing access to the oil storage tank 152. In some embodiments, the method can include determining, with the RTU 156, that a mobile device (not depicted) is within a defined range from an authentication node. In an example, the NRF chip 154 can be an authentication node, as depicted in FIG. 3. The method can include determining, with the RTU 156, whether the mobile device is authorized, based on a signal received from the mobile device. For example, the user of the mobile device can be a work associated with an oil transfer company. When the user arrives at the oil storage tank 152 to offload oil via a truck, for example, the user can approach the oil storage tank 152 and the NRF chip 154 (e.g., authentication node) to receive authorization to offload the oil. In some embodiments, the method can include releasing a lock (not depicted) associated with the oil storage tank 152 in response to determining, with the RTU 156, that the mobile device is authorized. For example, the releasing of the lock can be associated with releasing of a lock associated with a valve used in the offloading of oil from the oil storage tank. Although the lock is not depicted, the lock can be an electronic lock, which can be in communication with the RTU 156. Upon releasing of the lock, the worker can attach any necessary transfer equipment (e.g., hose) to the oil storage tank 152 and can transfer the oil to the transfer vehicle.

In some embodiments, the method can include receiving, with the RTU 156, data from a flow sensor, the data associated with an offloading of oil from the oil storage tank. In an example, the data associated with the offloading of oil from the oil storage tank can be collected during the offloading process and can be assembled into an offloading report by the RTU 156, using the received data. In some embodiments, the RTU 156 can collect the data associated with the offloading process and can send the raw data to a central computer (e.g., cloud) for further processing and analysis. Accordingly, a log can be generated according to the data collected by the RTU 156 and processed by the RTU 156 and/or the central computer. In some embodiments, when the mobile device is no longer in contact via the NRF chip 154, and/or other authentication node, the report can be generated by the RTU 156 and/or the data gathered from the flow meter 158 can be sent to the central computer. For example, the mobile device may no longer be in contact via the NRF chip 154 and/or other authentication node, when the worker leaves the oil storage site with the mobile device and is no longer within range of the NRF chip 154 and/or the authentication node.

In some embodiments, when the mobile device is no longer in contact via the NRF chip 154, and/or other authentication node, the RTU 156 can execute instructions to actuate the lock associated with the oil storage tank 152. For example, the RTU 156 can execute instructions in response to a determination that the mobile device is out of range of the NRF chip 154 and/or authentication node. Actuation of the lock can prevent unauthorized access to the oil storage tank 152. For example, a valve used for offloading oil can be locked, preventing access to the oil stored in the oil storage tank 152 by an unauthorized party.

For node design, the innovative tagging system using the NRF chip 154 can automatically authenticate and log the personnel who hauls away the oil or water from the storage tank 152. In an example, the authorized personnel can approach the tank by moving his cell phone to the NRF chip 154, or other authentication node. When the personnel hears a confirmation beeping sound, they can be authorized to haul away from this specific storage tank 152. Unauthorized persons will be automatically denied access. Once authorized, the RTU 156 can release the locks and automatically generate the logs, tank levels and reset the flow meter to start monitoring the whole process. Previously, the whole process used to be lengthy and manual, thus there might be significant economy losses for oil and gas companies due to the human errors. Automation of the process can rid human errors and any unauthorized activities associated with the storage tank 152. After completion of the offload, the system can close the lock, valves, and/or send the report to the central office or third party such as a trucking company, in real-time.

Figure 4:
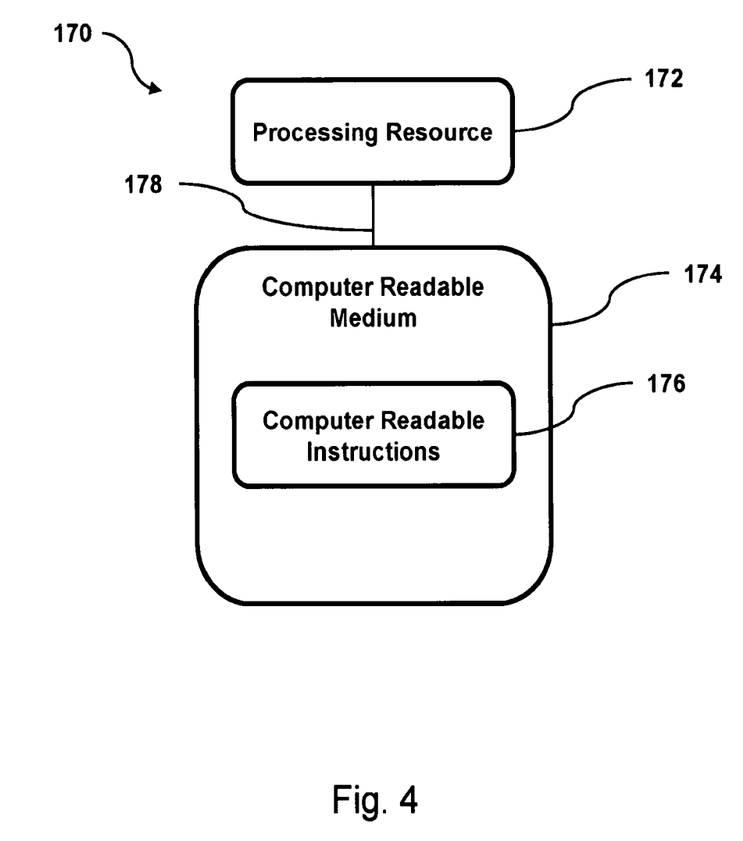
FIG. 4 depicts a diagram of an example of a computing device, in accordance with various embodiments of the present disclosure.

FIG. 4 depicts a diagram of an example of a computing device, in accordance with various embodiments of the present disclosure. The computing device 170 can utilize software, hardware, firmware, and/or logic to perform a number of functions described herein. In an example, the computing device 170 can be representative of the RTUs 122, 156, central computer, etc.

The computing device 170 can be a combination of hardware and instructions 176 to share information. The hardware, for example can include a processing resource 152 and/or a memory resource 174 (e.g., computer-readable medium (CRM), database, etc.). A processing resource 172, as used herein, can include a number of processors capable of executing instructions 176 stored by the memory resource 174. Processing resource 172 can be integrated in a single device or distributed across multiple devices. The instructions 176 (e.g., computer readable instructions (CRI)) can include instructions 176 stored on the memory resource 174 and executable by the processing resource 172 to implement a desired function (e.g., releasing a lock associated with the oil storage tank in response to determining, with the remote terminal unit, that the mobile device is authorized, as discussed in reference to FIG. 4, etc.).

The memory resource 174 can be in communication with the processing resource 172. The memory resource 174, as used herein, can include a number of memory components capable of storing instructions 176 that can be executed by the processing resource 172. Such memory resource 174 can be a non-transitory CRM. Memory resource 174 can be integrated in a single device or distributed across multiple devices. Further, memory resource 174 can be fully or partially integrated in the same device as processing resource 172 or it can be separate but accessible to that device and processing resource 172. Thus, it is noted that the computing device 170 can be implemented on a support device and/or a collection of support devices, on a mobile device and/or a collection of mobile devices, and/or a combination of the support devices and the mobile devices.

The memory resource 174 can be in communication with the processing resource 172 via a communication link 178 (e.g., path). The communication link 178 can be local or remote to a computing device associated with the processing resource 172. Examples of a local communication link 178 can include an electronic bus internal to a computing device where the memory resource 174 is one of a volatile, non-volatile, fixed, and/or removable storage medium in communication with the processing resource 172 via the electronic bus.

Link 178 (e.g., local, wide area, regional, or global network) represents a cable, wireless, fiber optic, or remote connection via a telecommunication link, an infrared link, a radio frequency link, and/or other connectors or systems that provide electronic communication. That is, the link 178 can, for example, include a link to an intranet, the Internet, or a combination of both, among other communication interfaces. The link 178 can also include intermediate proxies, for example, an intermediate proxy server (not shown), routers, switches, load balancers, and the like.

Figure 5:
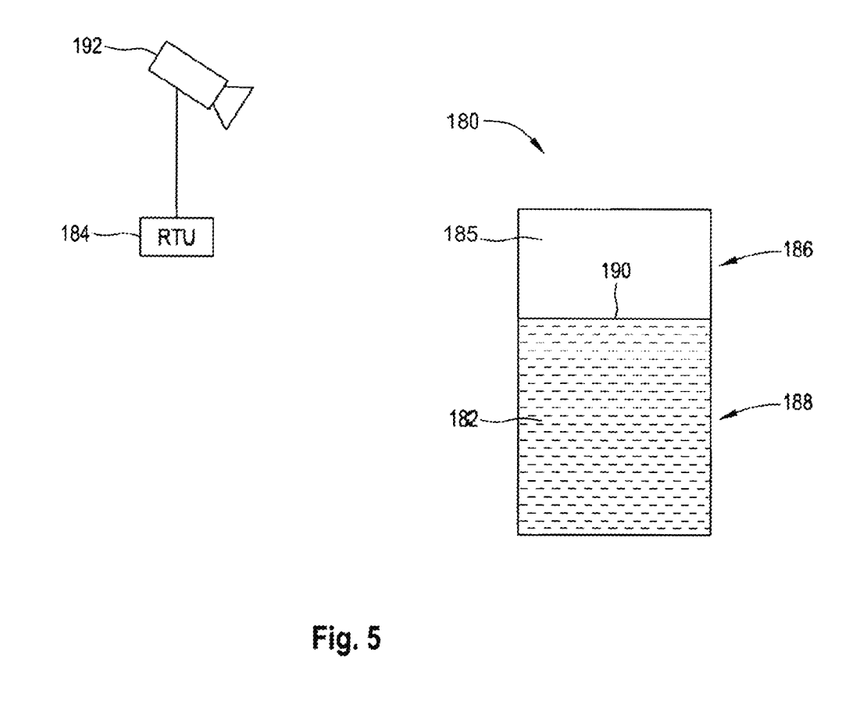
FIG. 5 depicts a thermal image of a storage tank, in accordance with embodiments of the present disclosure.

FIG. 5 depicts a thermal image of a storage tank 180, in accordance with embodiments of the present disclosure. As discussed in relation to FIG. 3, the level sensor 160 can be a thermal camera 192 in some embodiments. In an example, the thermal camera 192 can be a thermal video sensor, which can be in communication with an RTU 184 via a wired or wireless connection. The thermal camera 192 can capture a thermal image of a storage tank 180. As can be seen in FIG. 5, the storage tank 180 can be partially filled with a liquid 182, which can be an oil and/or gas, or another type of liquid (e.g., water, alcohol, etc.). In some embodiments, the liquid 182 can have a higher heat capacity than an air, which fills an empty portion of the tank. Accordingly, as a temperature in an environment in which the storage tank 180 is located varies, the portion of the storage tank 180 filled with the liquid 182 can be more resistant to a temperature change, due to its higher heat capacity. Accordingly, in an example where the environment in which the storage tank 180 is located fluctuates in temperature, a temperature of an empty portion 186 of the storage tank 180 can be different than a filled portion 188 of the storage tank 180.

For instance, as a temperature increases throughout the day, a temperature of an empty portion 186 can increase at a faster rate than a temperature of the filled portion 188, because a heat capacity of the liquid 182 filling the filled portion 188 is greater than a heat capacity of the air 185 filling the empty portion 186. Accordingly, a thermal interface 190 can form between the filled portion 188 and the empty portion 186. In an example, the thermal interface 190 can be a temperature differential between the filled portion 188 and the empty portion 186.

In some embodiments, the thermal camera 192 can capture the thermal image of the storage tank 180. In an example, the data associated with the thermal image of the storage tank 180 can be provided to the RTU 184, as discussed herein. The RTU 184 can analyze the data and can determine a profile of the storage tank included in the thermal image of the storage tank 180. For example, an outline of the storage tank can be determined in relation to a surrounding environment from the storage tank, which can be of a different temperature than the storage tank included in the thermal image of the storage tank 180. The profile of the storage tank can be defined as an outline of the storage tank, which can be used in calculations made by the RTU 184 that relate to how full the storage tank is. In an example, if the profile (e.g., outline of the storage tank is determined), a height and/or area of the storage tank can be determined. For example, if the thermal camera 192 faces a front of the storage tank, an area associated with the frontal profile surface of the storage tank can be determined and used in a calculation to determine how full the storage tank is.

In some embodiments, the RTU 184 can determine where the thermal interface 190 is located between the filled portion 188 of the storage tank and the empty portion 186 of the storage tank. In an example, the thermal interface 190 can be caused as a result of a changing temperature in an environment in which the tank is located. In an example, as the tank heats up or cools off throughout changing temperatures during the day or night, the thermal interface 190 can be caused due to the differing heat capacities of the fluids (e.g., air and liquid in the tank). For instance, a temperature of a liquid in filled portion 188 of the storage tank can change at a slower rate than air in the empty portion 186 of the storage tank. Based on where the thermal interface 190 is located, the level of fluid in the storage tank can be determined. In an example, a level of fluid in the storage tank can be determined, based on a location of the thermal interface 190 between the filled portion 188 of the storage tank and the empty portion 186 of the storage tank. For instance, as depicted in FIG. 5, the thermal interface 190 occurs at a level that is roughly 0.66 a height of the storage tank. Thus, a determination can be made that the liquid 182 filling the filled portion 188 of the tank occupies roughly 0.66 of the total tank volume (e.g., 66 percent of the total tank volume).

In some embodiments, a determination of the level of fluid in the storage tank can be based on an area occupied by the liquid in a profile thermal image of the tank. For example, from a side profile view (e.g., two-dimensional) thermal image of the storage tank 180, an area of which is occupied by the liquid (e.g., filled portion of the storage tank) and/or air (e.g., empty portion of the storage tank) can be determined. A proportion of the area of which is occupied by the liquid 182 and area of which is occupied by the air 185 can be determined. For example, as depicted, in FIG. 5, roughly twice the area is occupied by the liquid 182 (e.g., filled portion 188) than that occupied by the air 185 (e.g., empty portion). Accordingly, a determination can be made that the storage tank is 66 percent full.

In some embodiments, the level of the tank can be computed by the RTU 184 and can be conveyed to a cloud 124, as depicted in FIG. 2, or central computer. As discussed herein, one or more calculations and/or alerts can be generated based on the determination of the level of liquid 182.

For example, in some embodiments, an alert can be generated by the RTU 184 and/or a central computer that the tank needs to be emptied. In some embodiments, more than one storage tank can be within a field of view of the thermal camera 192. For instance, a plurality of storage tanks can be within a field of view of the thermal camera 192 and a level of liquid in each one of the storage tanks can be determined. In an example, each one of the plurality of storage tanks can be identified based on a differentiation in their thermal profile with respect to their surroundings. In some embodiments, the storage tanks can be manually identified in the thermal image.

Although some embodiments of the present disclosure are discussed in relation to determining a level of an oil and/or gas storage tank with the thermal camera 192, embodiments of the present disclosure can be applied to other industry areas. For example, embodiments of the present disclosure can be used to determine a level of alcohol in a bottle for inventory tracking in a bar and/or restaurant. For instance, a thermal camera can be placed, such that it can view a stock of bottles on shelves in a bar or restaurant. The thermal camera can identify the different bottles and determine a level of alcohol in each one of the bottles. In some embodiments, when a bar or restaurant opens, the heat can be turned up or the air conditioning can be turned on. This can result in a differential cooling profile of the bottles, which can be identified by the thermal camera 192 and used to determine a level in each bottle. Although an example is given of bottles in a bar or restaurant, embodiments of the present disclosure can be used to determine a level of any type of storage tank and/or vessel. For example, in a food processing area, tanks can be used to hold various ingredients and/or substances used in food processing. In some embodiments, the food processing area can be cooled down, resulting in a differential cooling profile of the tanks, which can be identified by a thermal camera 192 and used to determine a level in each one of the tanks.

Embodiments are described herein of various apparatuses, systems and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in this specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments", "some embodiments", "one embodiment", or "an embodiment", or the like, means that a particular feature, structure, or characteristic described in connection with the embodiment(s) is included in at least one embodiment. Thus, appearances of the phrases "in various embodiments", "in some embodiments", "in one embodiment", or "in an embodiment", or the like, in places throughout the specification, are not necessarily all referring to the same embodiment. Furthermore, the particular features, structures or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

What is claimed is:

1. A system for monitoring field level sensors at an oil site, comprising:
a plurality of different types of sensor nodes configured to monitor a characteristic associated with the oil site;
a remote terminal unit, wherein the remote terminal unit is located remote from the sensor nodes, the remote terminal unit including:
a processor and memory storing non-transitory computer readable instructions, the instructions executable by the processor to:
receive information from the sensor nodes,
determine that a mobile device is within a defined range from an authentication node located on the oil site,
determine whether the mobile device is authorized based on a signal received from the mobile device,
receiving, with the remote terminal unit, data from a sensor node from the sensor nodes that includes a flow sensor, the data associated with an offloading of oil from an oil storage tank, wherein the data includes an amount of the oil offloaded from the oil storage tank to a truck being driven by a user of the mobile device; and
a hub through which each of the plurality of sensor nodes are connected;
a central computer, wherein the remote terminal unit analyzes the information and sends the information from the sensor nodes to the central computer, in response to the analysis of the information; and
the authentication node, wherein the authentication node is configured to:
release a lock associated with the oil storage tank based on a proximity of the mobile device being less than a defined distance, and
wherein the authentication note is configured to lock the lock associated with the oil storage tank based on the proximity of the mobile device being greater than the defined distance.

2. The system of claim 1, wherein each of the plurality of sensor nodes monitors a different characteristic associated with the oil site.

3. The system of claim 2, wherein the remote terminal unit communicates with each of the plurality of sensor nodes wirelessly.

4. The system of claim 2, wherein each of the plurality of sensor nodes is directly connected to the remote terminal unit.

5. The system of claim 1, wherein the hub is powered separately from the remote terminal unit.

6. The system of claim 5, wherein one of the sensor nodes includes at least one of an audio recorder and a video recorder.

7. The system of claim 1, further comprising at least one of a long range radio and a cellular antenna in communication with the remote terminal unit, wherein the at least one of the long range radio and the cellular antenna are configured to transmit the information from the sensor nodes to the central computer via the remote terminal unit.

8. The system of claim 1, wherein the information from the sensor nodes is in an analog format.

9. The system of claim 1, wherein the information from the sensor nodes is converted into a digital format by the remote terminal unit.

10. The system of claim 1, wherein the information from the sensor nodes is in a digital format.

11. The system of claim 1, wherein the instructions executable by the processor further include second instructions executable by the processor to receive an update from the central computer.

12. The system of claim 1, wherein the sensor nodes measures a characteristic associated with the oil storage tank.

13. The system of claim 1, wherein the sensor node includes a microphone, and wherein the instructions are executable by the processor to determine a mechanical problem with a pump, based on a noise detected by the microphone.

14. A method for monitoring an oil site, comprising:
determining, with a remote terminal unit, that a mobile device is within a defined range from an authentication node;
determining, with the remote terminal unit, whether the mobile device is authorized, based on a signal received from the mobile device;
gathering information with a sensor node, the information including a characteristic associated with an oil storage tank from the sensor node, wherein the characteristic includes an amount of oil offloaded from the oil storage tank to a truck being driven by a user of the mobile device;
receiving the information with the remote terminal unit, wherein the remote terminal unit is in communication with the sensor node, and wherein the remote terminal unit is located remote from the sensor node; and
processing the information with the remote terminal unit and sending the information to a central computer, wherein said processing the information includes analyzing the information in relation to a set point, and wherein sending the information includes said sending the information based on the set point being met;
releasing a lock associated with the oil storage tank based on a proximity of the mobile device being less than a defined distance; and
locking the lock associated with the oil storage tank based on the proximity of the mobile device being greater than the defined distance.

15. The method of claim 14, further comprising releasing the lock associated with the oil storage tank in response to determining, with the remote terminal unit, that the mobile device is authorized.

16. The method of claim 14, further comprising sending the information received by the remote terminal unit associated with the offloading of the oil from the oil storage tank to the central computer, wherein an offloading report includes the amount of oil offloaded from the oil storage tank to the truck being driven by the user of the mobile device.

17. The method of claim 16, further comprising:
generating the offloading report with the remote terminal unit using the information received by the remote terminal unit; and
sending the offloading report to the central computer.

* * * * *